United States Patent [19]

Imakoshi et al.

[11] Patent Number: 4,703,378
[45] Date of Patent: Oct. 27, 1987

[54] MAGNETIC TRANSDUCER HEAD UTILIZING MAGNETORESISTANCE EFFECT

[75] Inventors: Shigeyoshi Imakoshi; Hideo Suyama; Yutaka Soda; Munekatsu Fukuyama; Yasuhiro Iida, all of Kanagawa, Japan

[73] Assignee: Sony Corporation, Tokyo, Japan

[21] Appl. No.: 705,706

[22] Filed: Feb. 26, 1985

[30] Foreign Application Priority Data

| Mar. 1, 1984 | [JP] | Japan | 59-38980 |
| Jun. 8, 1984 | [JP] | Japan | 59-117625 |
| Aug. 24, 1984 | [JP] | Japan | 59-176476 |
| Aug. 28, 1984 | [JP] | Japan | 59-178833 |
| Aug. 28, 1984 | [JP] | Japan | 59-178831 |

[51] Int. Cl.$^4$ ............................................. G11B 5/127
[52] U.S. Cl. ................................................... 360/113
[58] Field of Search .......................... 360/113, 67, 66; 324/249

[56] References Cited

U.S. PATENT DOCUMENTS 3,979,775  9/1976  Schwarz .............................. 360/113
4,374,403  2/1983  Oshima et al. ...................... 360/113

Primary Examiner—Vincent P. Canney
Attorney, Agent, or Firm—Hill, Van Santen, Steadman & Simpson

[57] ABSTRACT

A magnetoresistance effect type magnetic transducer head apparatus comprises a magnetoresistance effect sensing element, means for applying a high-frequency magnetic field to the sensing element, means for taking-out an output signal from the sensing element, a filter for taking-out the high-frequency component of the output, and another filter for rectifying the output and taking-out the low-frequency component. The magnetic head apparatus may be constructed as a digital circuit so that a multi-channel apparatus can be easily implemented.

15 Claims, 24 Drawing Figures

MAGNETIC TRANSDUCER HEAD UTILIZING MAGNETORESISTANCE EFFECT

RELATED APPLICATION

This case is related to application Ser. No. 769,937, filed Aug. 27, 1985.

BACKGROUND OF THE INVENTION

1. Field of the Invention

The present invention relates to a magnetic transducer head having a magnetoresistance effect, and more particularly to a magnetoresistance effect type magnetic head apparatus having bias means.

2. Description of the Prior Art

A magnetoresistance (hereinafter referred to as "MR" effect) effect type magnetic head apparatus has a head member h with a structure as shown in FIG. 1A and FIG. 1B. FIG. 1A is a sectional view of an essential part of an MR head, and FIG. 1B is a plan view thereof. On a magnetic substrate 1 of Ni-Zn ferrite or Mn-Zn ferrite, or through an insulating layer 2 of $SiO_2$ etc. on the substrate 1 if it is conductive, a bias conductor 3 of band-shaped conductive film is applied. This forms a bias magnetic field generating current passage for applying a bias magnetic field to an MR sensing element as hereinafter described. An MR sensing element 5 comprising MR magnetic thin film on Ni-Fe alloys or Ni-Co alloys is arranged on the bias conductor 3 through an insulating layer 4. A pair of magnetic layers 7 and 8 of Mo permalloy or the like to form a magnetic core of part of a magnetic circuit so that the magnetic layers 7 and 8 ride at each one end on the MR sensing element 5 through a thin insulating layer 6 and extend across the bias conductor 3 and the MR sensing element 5. A protective substrate 10 is provided for the substrate 1 through a non-magnetic protective layer 9. An operating magnetic gap g is formed between one magnetic layer 7 and the front end of the substrate 1 through a non-magnetic gap spacer layer 11 comprising, for example, the insulation layer 6 having a required thickness. At a front surface of the substrate 1, the gap spacer layer 11, the magnetic layer 7, the protective layer 9 and the protective substrate 10 are polished so as to form an opposing surface 12 for a magnetic recording medium. The magnetic gap g is formed there and faces the recording medium. The rear end of the magnetic layer 7 which forms the magnetic gap g and the front end of the other magnetic layer 8 are formed to rest on the MR sensing element 5 through the insulating layer 6, and both ends are spaced from each other by a discontinuous portion 13. The rear end of the magnetic layer 7 and the front end of the magnetic layer 8 are electrically insulated from the MR sensing element 5 by the insulating layer 6, but are magnetically connected thereto. The discontinuous portion 13 between both magnetic layers 7 and 8 is magnetically connected by the MR sensing element 5, so that a magnetic circuit is formed around the substrate 1, namely: the magnetic gap g—the magnetic layer 7—the MR sensing element 5—the magnetic layer 8—the substrate 1.

FIG. 2 shows an enlarged sectional view of an MR type head apparatus of a so-called shield type as another example. In the head apparatus of FIG. 2, a bias conductor 3 and an MR sensing element 5 opposed thereto are positioned between high permeability magnetic bodies 60 and 61 such as ferrite through a non-magnetic layer 62, and one end surface is polished so as to form a tape opposing surface 12.

In such an MR type magnetic head apparatus, signal magnetic flux from the front gap g opposed to the magnetic recording medium flows in the MR element through the above-mentioned magnetic circuit in the case of the MR head of FIG. 1A, or directly in the MR element in the case of FIG. 2. Thus a resistance value of the MR sensing element 5 varies in response to the external magnetic field by the signal magnetic flux. Variation of the resistance value is detected as a voltage variation across the MR sensing element 5 while sensing current flows through the MR sensing element 5. Thus thereby reproduction of the recording signal on the magnetic recording medium is effected. In this case, the MR sensing element 5 must be magnetically biased in order that the MR sensing element 5 acts linearly as a magnetic sensor and has high sensitivity. The bias magnetic field is applied by the magnetic field generated by energizing the bias conductor 3 and by the magnetic field generated by the detecting current itself flowing through the MR sensing element 5.

In the MR type magnetic head apparatus as clearly seen in a schematic constitution of FIG. 3, the MR sensing element 5 is applied with the generated magnetic field while a prescribed d.c. current $i_B$ flows through the bias conductor 3, and at the same time a prescribed sensing current $i_{MR}$ flows through the MR sensing element 5. In such a state, the MR sensing element 5 is applied with the bias magnetic field HB composed of the magnetic field generated by energizing the bias conductor 3 and the magnetic field generated by the detecting current flowing through the MR sensing element 5. In such a bias condition the signal magnetic field $H_S$ is applied from the magnetic recording medium. A voltage across the MR sensing element 5, based on the resistance variation by the signal magnetic field $H_S$, i.e. the variation of potential at point A, is amplified by an amplifier 14 and is detected at an output terminal 15. Numeral 16 designates a coupling condensor.

FIG. 4 shows a working characteristic curve of the MR sensing element 5 illustrating the relation between the magnetic field H and the resistance value R. It is clear from FIG. 4 that the resistance R follows a parabolic curve which is convex in an upward direction in the range of the magnetic field H and is small in absolute value, i.e. $-H_{BR} \sim +H_{BR}$. However, the resistance R deviates from the parabolic curve and gradually approaches the value $R_{min}$ when magnetization of the MR magnetic thin film at a center portion becomes saturated in the magnetic circuit direction. The maximum value $R_{max}$ of the resistance R indicates that the magnetization of the MR magnetic thin film is directed entirely in the current direction. The bias magnetic field $H_B$ is applied at the characteristic portion according to a parabolic curve in the working characteristic curve, and the signal magnetic field shown by numeral 17 in FIG. 4 is applied from the magnetic recording medium. Then, corresponding to the signal magnetic field, an output according to the variation of the resistance value as shown by numeral 18 in FIG. 4 is obtained. In this case, however, the greater the signal magnetic field, the greater the second harmonic distortion.

In the MR type magnetic head apparatus, the potential at point A of FIG. 3 is determined by the fixed component and variable component of the resistance in the MR sensing element 5. Since the fixed component in this case is about 98% and is largely dependent on temperature, the temperature drift of the potential at point A becomes large. The resistance value R in the MR sensing element 5 is represented by the following formula:

$$R = R_0(1 + \alpha \cos^2\theta) \quad (1)$$

wherein $R_0$ stands for the fixed component of resistance, $\alpha$ stands for the maximum resistance variation factor, $\theta$ stands for the angle between the current direction and the magnetizing direction in the MR sensing element 5. For example, if the MR sensing element 5 is an MR magnetic thin film of 81Ni-19Fe alloy (permalloy) with thickness 250 Å, the measured value of $\alpha$ becomes about $\alpha = 0.017$. The value of $\alpha$ in this case is dependent more or less on the thickness or the material of the MR magnetic thin film of the MR sensing element 5, and becomes about $\alpha = 0.05$, at the most. On the other hand, $R_o$ is represented by following formula:

$$R_o = R_i(1 + a\Delta t) \quad (2)$$

wherein $R_i$ stands for the initial value of resistance, a stands for the temperature coefficient, and $\Delta t$ stands for the temperature variable component.

The measured value of the temperature coefficient a in the above example of the MR sensing element 5 is about $a = 0.0027/\text{deg}$. This may produce a large noise when detecting the d.c. magnetic field. In order to avoid the temperature dependence in the MR magnetic head apparatus, it is usual in differential construction techniques to cancel the temperature dependence.

Moreover, in such an MR type magnetic head element, since the temperature coefficient is large as above described, for example, when heat generated by energizing the MR sensing element 5 or by the bias current flowing through the bias conductor 3 is radiated in unstable fashion by at rubbing of the heat element with the magnetic recording medium, the head temperature thus varies, and a large noise, i.e. a so-called rubbing noise, may be produced.

If the amplifier 14 in FIG. 3 has a low-impedance input, assuming that the cut-off frequency by the capacitor 16 is $f_o$, the required capacitance C for the capacitor 16 becomes $$C = \frac{1}{R\omega_o} \quad (3)$$

wherein $\omega_o = 2\pi f_o$.

If the MR sensing element 5 is made of the permalloy with a thickness of 250 Å and length of 50 μm, the resistance value R becomes about 120Ω. If $f_o = 1$ kHz, the value of C must be as large as C = 1.3 μF. This becomes a problem particularly when the magnetic head apparatus of a multi-track type is formed.

Permeability in a magnetic circuit, particularly that in the magnetic layers 7 and 8 having a relatively small thickness and sectional area, is preferably as large as possible Since the permeability becomes maximum when the external magnetic field is zero, the application of the above-mentioned bias magnetic field lowers the permeability.

The above-mentioned MR type magnetic head apparatus in the d.c. bias system is advantageous in that effective track width is large and a narrow track is easily implemented. On the contrary, it is disadvantageous since the linearity is bad, the d.c. reproduction is difficult, the rubbing noise is large, the Barkhausen noise is large, and dispersion of the output is large.

In the prior art, an MR type magnetic head apparatus particularly for removal of second harmonic distortion of the output signal has been proposed. Such a magnetic head apparatus will now be described referring to FIG. 5. A head member h is composed of an MR sensing element 5 with the neutral point grounded and two parts 5a, 5b having equal characteristics, and of a bias conductor 3 with the neutral point grounded and two parts 3a, 3b having equal characteristics. Both ends of the MR sensing element 5 is supplied with the same detecting current $i_{MR}$ in reverse directions from each other. Both ends of the bias conductor 3 are also supplied with the same d.c. current $i_B$ in reverse directions from each other. Thus, the parts 5a, 5b in the MR sensing elements 5 are applied with the bias magnetic field HB in reverse directions from each other on the basis of the magnetic field generated by the d.c. current $i_B$ flowing through the two parts 3a, 3b of the bias conductor 3, and the magnetic field is generated by the detecting current $i_{MR}$ flowing through the MR sensing element 5 and also with the same signal magnetic field $H_s$ from the magnetic recording medium. A voltage across the MR sensing element 5 based on the resistance variation by the signal magnetic field $H_s$, that is, the variation of potential at points $A_1$, $A_2$, is supplied to a differential amplifier 14'. In this constitution, the points $A_1$, $A_2$ have output voltages in inverted phase from each other but with second harmonics in the same phase. Thus an output signal with little distortion results by removing the second harmonics at the output side of the differential amplifier 14', i.e. at an output terminal 15.

However, the MR type xagnetic head apparatus of FIG. 5 in the prior art has the following disadvantages. Since equalization of characteristics at the two parts 5a, 5b of the MR sensing element 5 with a high accuracy is difficult, and equalization of the magnetic field to the two parts 5a, 5b of the MR sensing element 5 with high accuracy is also difficult, an offset may be produced in the output signal. Since a non-sensitive region is produced at the border between the two parts of the MR sensing element 5, a width of the head element 5 cannot be narrowed appreciably and therefore the multi-channel apparatus cannot be easily implemented. An increase of the number of leads for the element also makes difficult the implementation of the multi-channel apparatus.

An MR type magnetic head apparatus of a barber pole type also has been proposed. In this apparatus, a number of conductor bars of gold or the like in parallel to each other are adhered to the MR sensing element in the MR type magnetic head element in an oblique direction to the longitudinal direction of the MR sensing element.

The MR magnetic apparatus of a barber pole type is advantageous in that dispersion of the output is little and the circuit may be formed by an amplifier only. On the contrary, it is disadvantageous since the d.c. reproduction is difficult, the rubbing noise is large, the narrow track cannot be implemented easily, and the effective track width is not very large.

SUMMARY OF THE INVENTION

It is an object of the present invention to provide an improved magnetic transducer head utilizing the magnetoresistance effect and which overcomes the prior art drawbacks.

It is another object of the present invention to provide a magnetoresistance effect type magnetic transducer head which has superior response linearity.

It is a further object of the present invention to provide a magnetoresistance type magnetic transducer head having improved second harmonic distortion.

It is a still further object of the present invention to provide a magnetoresistance effect type magnetic transducer head which has improved temperature stability.

It is yet a further object of the present invention to provide a magnetoresistance effect type magnetic transducer head having an improved dynamic range.

It is still another object of the present invention to provide an improved multi-channel magnetic transducer head utilizing the magnetoresistance effect.

According to one aspect of the present invention, there is provided a magnetic transducer head utilizing the magnetoresistance effect which comprises a magnetoresistance effect sensing element sensing a signal magnetic field on a travelling magnetic recording medium, means for applying a high frequency magnetic field to said sensing element, means for obtaining an output from said sensing element, means for rectifying said output, and a low pass filter means supplied with said rectified signal for deriving an output corresponding to said signal magnetic field.

According to another aspect of the present invention, there is provided a magnetic transducer head utilizing the magnetoresistance effect which comprises a magnetoresistance effect sensing element sensing a signal magnetic field on a travelling magnetic recording medium, means for deriving a high frequency signal, means for applying a high frequency magnetic field synchronized with said high frequency signal to said sensing element, means for obtaining an output from said sensing element, means for multiplying said output with said high frequency signal to derive a multiplied signal, and a low pass filter means supplied with said multiplied signal for deriving an output corresponding to said signal magnetic field.

DESCRIPTION OF THE PREFERRED EMBODIMENTS

EXAMPLE 1

Figure 1A:
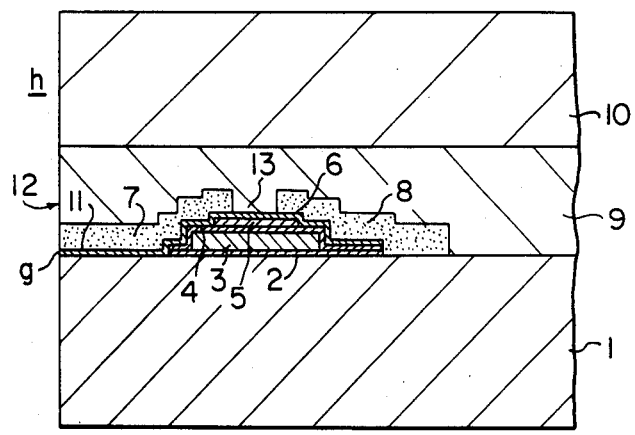
FIG. 1A is an enlarged sectional view of essential part of an MR magnetic head apparatus of yoke type.
Figure 1B:
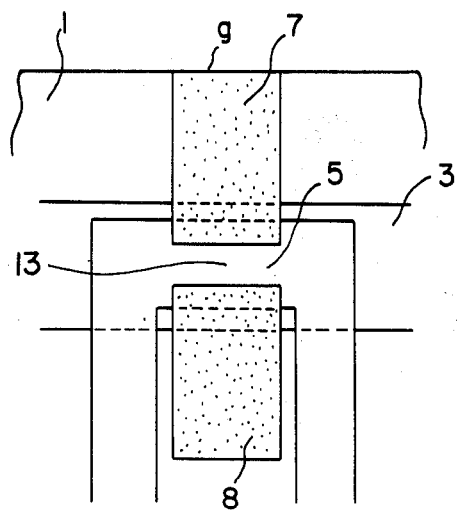
FIG. 1B is a plan view of the magnetic head apparatus FIG. 1A.
Figure 2:
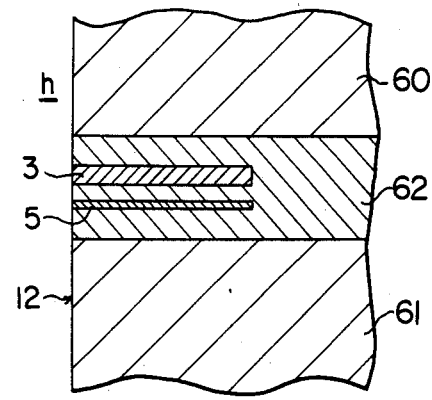
FIG. 2 is an enlarged sectional view of essential part of an MR magnetic head apparatus of shield type.
Figure 3:
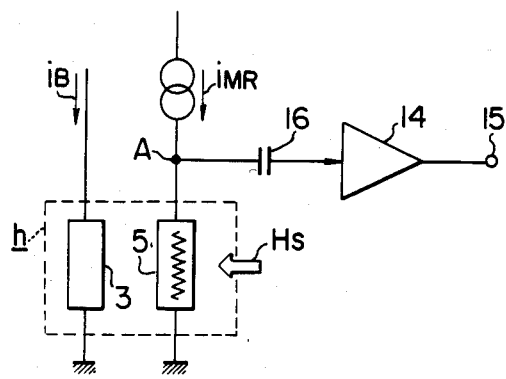
FIG. 3 is a diagram illustrating a construction of an MR magnetic head apparatus in the prior art.
Figure 6:
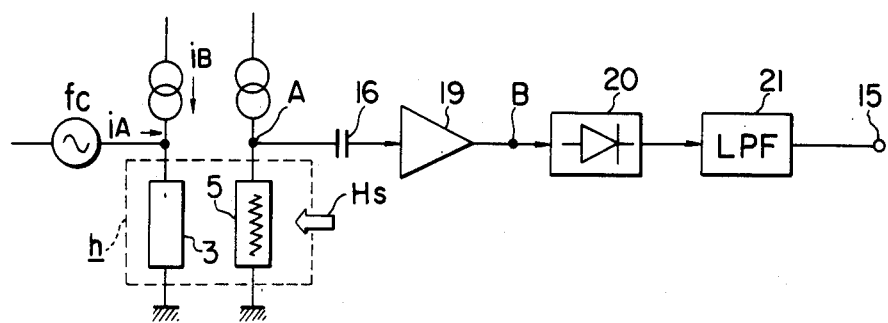
FIG. 6 is a diagram illustrating a construction of an MR magnetic head apparatus as an embodiment of the invention.
Figure 7:
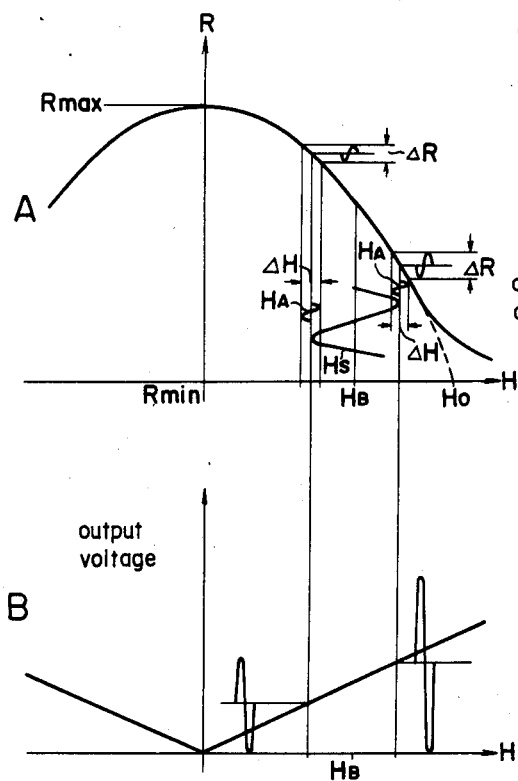
FIG. 7A is a diagram of an MR characteristic curve illustrating operation of the MR magnetic head apparatus of the invention.
FIG. 7B is a diagram illustrating operation of the MR magnetic head apparatus of the invention.

An MR type magnetic head as an embodiment of the invention will now be described referring to FIG. 6. In the embodiment, since an MR type head element h has similar construction to that described in FIG. 1 and FIG. 3, and parts in FIG. 6 corresponding to FIG. 1 and FIG. 3 are designated by the same reference numerals and the repeated description shall be omitted. In a bias conductor 3 of the head element h of the embodiment, small a.c. bias current $i_A$ of a high frequency $f_c$ flows in superposition to d.c. bias current $i_B$, and thus a high frequency magnetic field is applied to an MR sensing element 5. The waveform of the a.c. bias current $i_A$ and hence the waveform of the a.c. magnetic field, may be sinusoidal or rectangular. Thus the MR sensing element 5 is applied with the a.c. bias magnetic field superimposed with the d.c. bias magnetic field. Thus, an a.c. signal of frequency $f_c$ is derived across the MR sensing element 5, i.e. at point A in FIG. 6. FIG. 7 shows operation when the d.c. bias magnetic field $H_B$, the signal magnetic field $H_S$, and the a.c. bias magnetic field $H_A$ are superimposed. If the variation $\Delta H$ of the a.c. bias magnetic field $H_A$ is small, the amount of resistance variation $\Delta R$ to the variation of the a.c. bias magnetic field at a given moment is obtained as an absolute value of a differential of a curve in FIG. 7A. Since this is the differential of the parabolic curve, a variation of resistance as compared to the d.c. bias magnetic field $H_B$ and the signal magnetic field $H_S$ becomes linear in principle as shown in FIG. 7B. Consequently, the amount of the a.c. signal obtained at the point A in FIG. 6 varies corresponding to the sum of the d.c. bias magnetic field $H_B$ and the signal magnetic field at the magnetic recording medium. As shown in FIG. 6, the output at point A passes through an amplifier 19 to pass the above-mentioned frequency component $f_c$ and is rectified by a rectifier 20 and then passes through a low pass filter 21. An output is thus obtained corresponding to the signal magnetic field from the magnetic medium. If the final output obtained at an output terminal 15 must have a frequency band 0–100 kHz, the frequency $f_c$ of the a.c. current $i_A$ may be made much higher than the frequency band, for example, $f_c = 1$ MHz. In this case, a low cutoff frequency of the amplifier 19 is selected higher than 100 kHz and lower than the $f_c = 1$ MHz, for example 500 kHz. An output from the high pass filter 19 is rectified by the rectifier 20 and then passes through the low pass filter 21 with cutoff frequency 100 kHz as already described. Thus a signal of in the frequency band 0–100 kHz is obtained.

Figure 8:
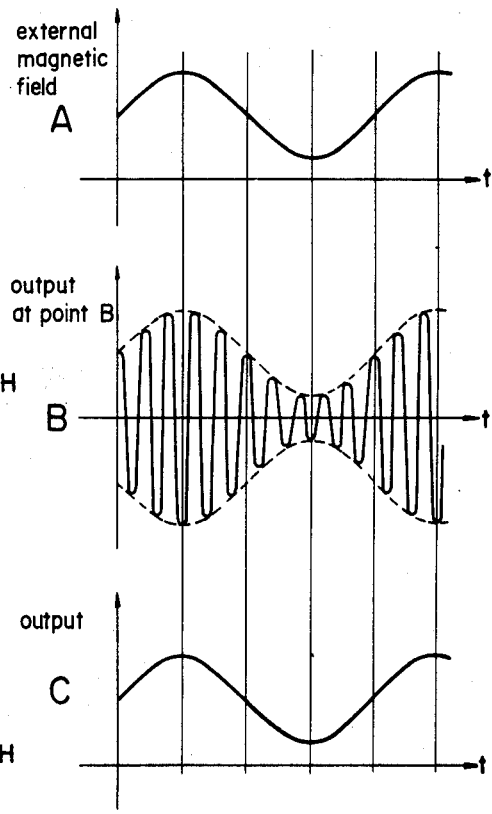
FIG. 8A-C is a waveform chart illustrating operation of the MR magnetic head apparatus of the invention.

In the magnetic head apparatus of such a construction, if an external magnetic field (signal magnetic field + bias magnetic field) shown in FIG. 8A is applied to the MR sensing element 5, and where the carrier of the frequency $f_c$ is amplitude-modulated by a signal as shown in FIG. 8B (as present at point B in FIG. 6), an output corresponding to the signal magnetic field as shown in FIG. 8C is derived at the output terminal 15.

In the magnetic head apparatus of the invention, since an output of linear operation characteristics of the MR sensing element 5 corresponding to the differential of the original operation characteristics curve of second order is derived, the distortionless reproduction signal can be obtained.

Even if a fixed component of resistance of the MR sensing element is largely dependent on temperature, the invention, functioning according to characteristics of the differential of the performance characteristics curve of the MR sensing element, can eliminate the influence of the temperature dependence of the fixed component, and can reduce the temperature drift significantly.

Since the temperature dependence of the fixed component of resistance of the MR sensing element 5 is eliminated as above described, noise caused by rubbing with the magnetic recording medium can be improved.

Further, since a capacitor 16 of the invention may only pass the frequency $f_c$, if $f_c = 500$ kHz for example, capacitance C of the capacitor 16 may be C = 2600 pF. If the $f_c$ is further increased, the capacitance C may be further reduced.

EXAMPLE 2

Figure 9:
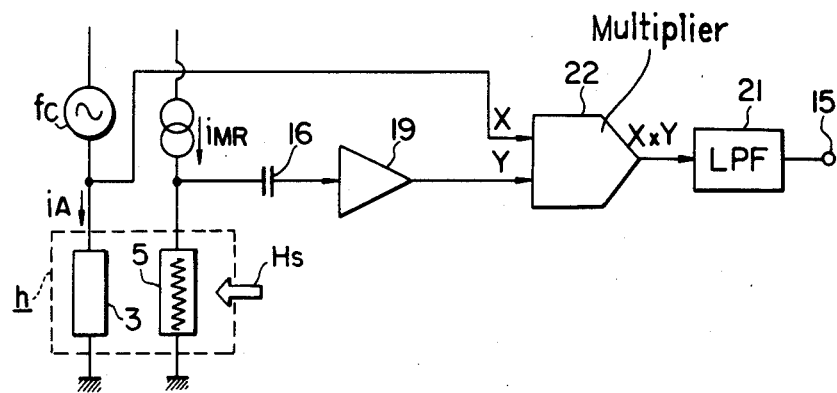
FIG. 9 is a diagram illustrating a construction of an MR magnetic head apparatus an another embodiment of the invention.
Figure 10:
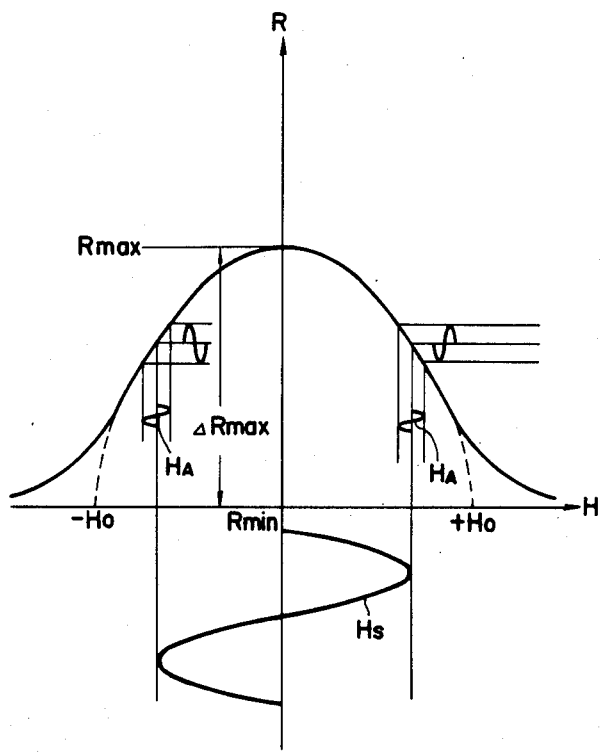
FIG. 10 is a diagram of an MR characteristic curve illustrating operation of the magnetic head apparatus in FIG. 9.

FIG. 9 is a schematic diagram of an MR type magnetic head in another embodiment of the invention. Parts in FIG. 9 corresponding to FIG. 6 are designated by the same reference numerals and the repeated description shall be omitted. In this case, a bias conductor 3 is not supplied with d.c. bias current, but with a.c. bias current $i_A$ only. FIG. 10 shows the operation schematically. In FIG. 10, the R - H operation characteristics curve is shown by a solid line, and an extrapolation of a parabolic curve portion of the characteristic is shown by a broken line. The magnetic field indicating a minimum resistance value $R_{min}$ in the extrapolation portion of the curve is $+H_o$ and $-H_o$. As shown in FIG. 10, an a.c. bias magnetic field $H_A$ is superimposed on a signal magnetic field $H_S$ in the embodiment. Then a resistance variation of an MR sensing element 5 in response to the a.c. bias magnetic field is obtained corresponding to the polarity and intensity of the signal magnetic field.

In this case, the MR operation characteristics curve is a parabolic curve, and the resistance value $R_{mr}$ of the MR sensing element is represented as follows:

$$R_{mr} = R_{max} - \Delta R_{max} \frac{H^2}{H_o} \quad (4)$$

where $\Delta R_{max} = R_{max} - R_{min}$. The magnetic field H is applied to the MR sensing element 5. The magnetic field H is represented by the sum of the bias magnetic field $H_A(t)$ and the signal magnetic field $H_S(t)$ as follows:

$$H(t) = H_A(t) + H_S(t) \quad (5)$$

where the $H_A(t)$ is generated by the bias conductor 3 and set to $$H_A(t) = H_A \cdot \sin(\omega_c t) \quad (6)$$

where $$\omega c = 2\pi f c \quad (7)$$

If the MR detecting current is represented by I, output V(t) of the MR sensing element 5 becomes $$V(t) = I \cdot R_{mr} \quad (8)$$

From the above formulae (4), (5), (6), it follows that $$V(t) = I \cdot R_{max} - I \cdot \frac{\Delta R_{max}}{H_o^2} \times \quad (9)$$

$$\{H_{Ao}^2 \cdot \sin^2 t + 2H_{Ao} \cdot H_S(t) \times \sin(\omega t) + (H_S(t))^2\}$$

Next, V(t) and the signal having the same phase and frequency as that of the a.c. bias magnetic field $H_A$, e.g. sin ($\omega t$), are multiplied by a multiplier 20. The multiplication output $V_z(t)$ becomes $$V_z(t) = V(t) \cdot \sin(\omega t) \quad (10)$$

$$= I \cdot R_{max} \cdot \sin(\omega t) - I \frac{\Delta R_{max}}{H^2} \cdot \{H_{Ao}^2 \cdot \sin^2(\omega t) +$$

$$2H_{Ao} \cdot H_s(t) \cdot \sin(\omega t) + (H_s(t))^2\} \cdot \sin(\omega t)$$

Then the output $V_z$ passes through a low pass filter 21, terms having $\omega$ component in formula (10) are eliminated. It follows therefore that $$I \cdot R_{max} \cdot \sin(\omega t) \rightarrow 0 \quad (11)$$

$$H_{Ao}^2 \cdot \sin^2(\omega t) = \frac{H_{Ao}}{2} \{\sin(\omega t) - \cos(2\omega t) \times \sin(\omega t)\} \rightarrow 0$$

$$(13)$$

$$2H_{Ao} \cdot H_s(t) \cdot \sin^2(\omega t) = H_{Ao} \cdot H_s(t) \cdot \{1 - \cos(2\omega t)\} \rightarrow H_{Ao} \cdot H_s(t)$$

$$\{H_s(t)\}^2 \cdot \sin(\omega t) \rightarrow 0 \quad (14)$$

Consequently, output voltage Vo(t) obtained at a terminal 15 becomes $$V_o(t) = -I \cdot \Delta R_{max} \times \frac{H_{Ao} \cdot H_s(t)}{H_o^2} \quad (15)$$

Thus, a voltage proportional to the signal magnetic field $H_S(t)$ is obtained. Even if the signal magnetic field component $H_S(t)$ is contained in the input to the multiplier 20, it does not appear in the output in this case. Consequently, the amplifier 19 is not necessarily always required.

According to the above construction, the output corresponding to the polarity of the external magnetic field can be taken out. In addition to advantages similar to those in the previous embodiment, this construction is advantageous in that the dynamic range becomes large. Furthermore, in this case, if the magnetic bias is an a.c. component only, a decrease of permeability of the magnetic circuit caused by the d.c. bias magnetic field can be avoided.

EXAMPLE 3

Figure 11:
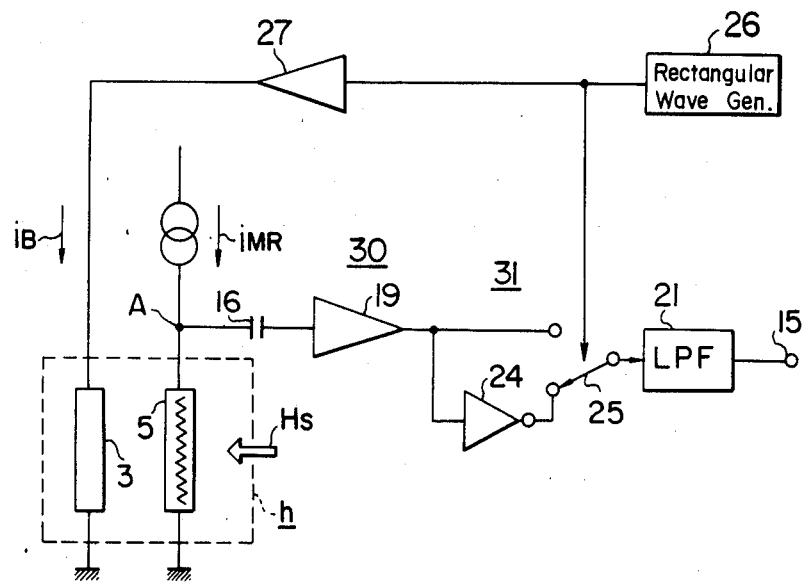
FIG. 11 is a diagram illustrating a construction of an MR magnetic head apparatus as another embodiment of the invention.

A third embodiment of the invention will now be described in detail referring to FIG. 11. The construction of an MR type magnetic head element h is similar to FIG. 1 and FIG. 3. Numeral 26 designates a rectangular wave generator, and a frequency of the rectangular wave signal is selected to be three times or more the maximum frequency of the signal magnetic field (d.c. field will do). The rectangular wave signal is supplied to a buffer amplifier (current driver) 27, and the output of the buffer 27 permits a bias current $i_B$ of a rectangular wave shape to flow through a bias conductor 3.

When the bias magnetic field $H_B$ is applied by the rectangular wave magnetic field generated by the rectangular wave current $i_B$ flowing through the bias conductor 3 and the magnetic field generated by the detecting current $i_{MR}$ flowing through the MR sensing element 5, the signal magnetic field $H_S$ from the magnetic recording medium is applied to the MR sensing element 5. A variation of voltage across the MR sensing element 5 based on a resistance variation by the signal magnetic field $H_S$, i.e. a variation of potential at point A, is taken out by a signal taking-out means 30 where the signal is supplied through a coupling capacitor 16 to an amplifier 19 and amplified. The output of the amplifier 19 is supplied to a phase converter changing circuit 31 where the output of the amplifier 19 is phase-inverted alternately in a non-inverted phase and an inverted phase according to the rectangular wave signal from the rectangular wave generator 26. More specifically, the output of the amplifier 19 and the inverted output of an inverter 24 are alternately supplied by a switch 25 controlled by the rectangular wave signal to a low pass filter 26, and the signal output corresponding to the signal magnetic field $H_S$ is obtained at an output terminal 15.

Figure 12:
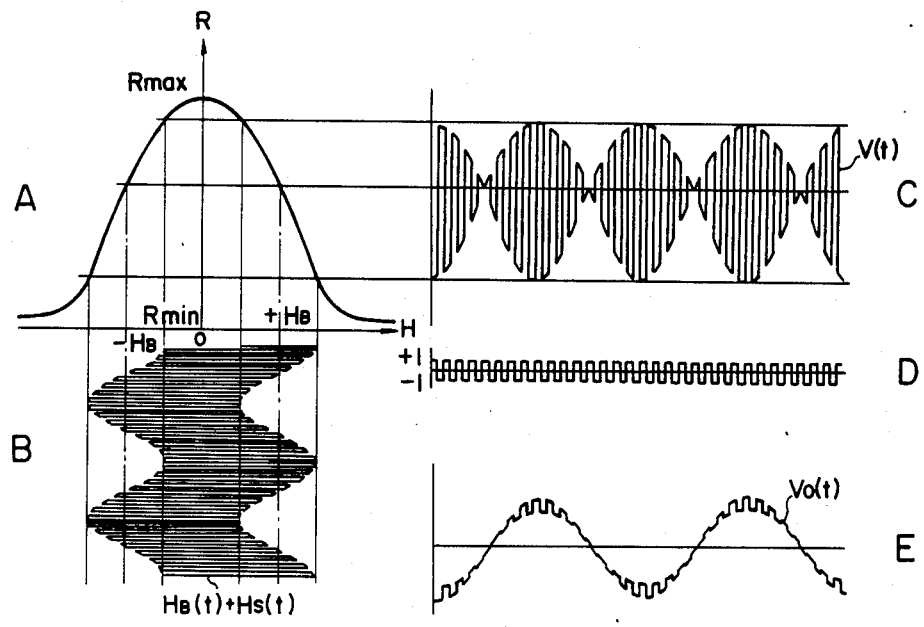
FIG. 12A-E is a waveform chart illustrating operation of the magnetic head apparatus in FIG. 11.

Next, operation of the magnetic head apparatus of FIG. 11 will be described referring also to FIG. 12. FIG. 12A shows a characteristic curve of resistance versus magnetic field in the MR sensing element 5. Since the MR sensing element 5 is applied with a magnetic field (which is a superimposition of the signal magnetic field $H_S(t)$ and the rectangular wave bias magnetic field $H_B(t)$) with a relatively large level as shown in FIG. 12B, an output voltage V(t) assymmetric to a positive or a negative polarity as shown in FIG. 12C is obtained from the MR sensing element 5. If the output voltage V(t) is changed alternately to a non-inverted phase or an inverted phase by the phase converter changing circuit 31 in synchronization with the rectangular wave bias magnetic field $H_B(t)$, signal output Vo(t) corresponding to the signal magnetic field $H_S(t)$ in FIG. 12B is obtained at the output side of the low pass filter 21, i.e. the output terminal 15.

The above mentioned MR type magnetic head apparatus comprises the magnetoresistance effect sensing element 5 to which signal magnetic field is applied, the bias magnetic field generating means 3, 26, 27 which applies the magnetoresistance effect sensing element 5 with a rectangular wave bias magnetic field of prescribed the signal taking-out means 30 which takes out an output signal corresponding to the signal magnetic field from the magnetoresistance effect sensing element 5, the phase converter 31 which receives an output signal from the signal taking-out means 30 and generates a signal of non-inverted phase and inverted phase alternately in synchronization with the rectangular wave bias magnetic field, and the low pass filter 21 to which the output signal of the phase converter 31 is supplied. According to the MR type magnetic head apparatus in such a construction, an offset is not produced in the output signal, the apparatus can be easily formed as a multi-channel structure, and distortion is reduced by eliminating second harmonics of the output signal.

Furthermore, in the MR type magnetic head apparatus of the invention, noise caused by rubbing against a tape is hardly generated, and even if a capacitor of the signal taking-out means has a small capacitance, signals down to d.c. signal can be obtain.

It seems in the MR type magnetic head apparatus of FIG. 3 that a rectangular wave bias current flows through the bias conductor 3, a signal output from the signal taking-out means is multiplied with a rectangular wave signal in synchronization with the bias current, and the multiplication output is supplied to the low pass filter. Thus, a signal output corresponding to the signal magnetic field is obtained. However, such construction has disadvantages as set forth hereafter.

A filter must be provided to eliminate a signal component caused by a variation of a fixed component of the resistance in the MR sensing element 5, or otherwise the rectangular wave current must be supplied to a resistor having the same resistance value as that of the fixed component of the resistance in order to subtract the signal corresponding to the voltage across the resistor from the signal output, and to cancel the signal component caused by variation of the fixed component of the resistance. An amplifier of a wide dynamic range is required. The low pass filter must have a sharp cut-off property. However, the embodiment does not have any of such disadvantages.

EXAMPLE 4

A fourth embodiment of the invention will now be described referring to FIG. 13. The embodiment relates to the application of the invention to the magnetoresistance effect type magnetic head in FIG. 9, and parts in FIG. 13 corresponding to FIG. 9 are designated by the same reference numerals and the repeated description shall be omitted. In the embodiment, the signal output from a low pass filter 21 is supplied to a buffer amplifier 28, and current $i_{FB}$ from the buffer amplifier 23 flows through a bias conductor 3. Negative feedback magnetic field $H_{FB}$ is generated from the bias conductor 3 (A separate bias conductor may be provided, and the current $i_{FB}$ may flow through the separate bias conductor.) and is supplied to an MR sensing element 5.

Figure 14:
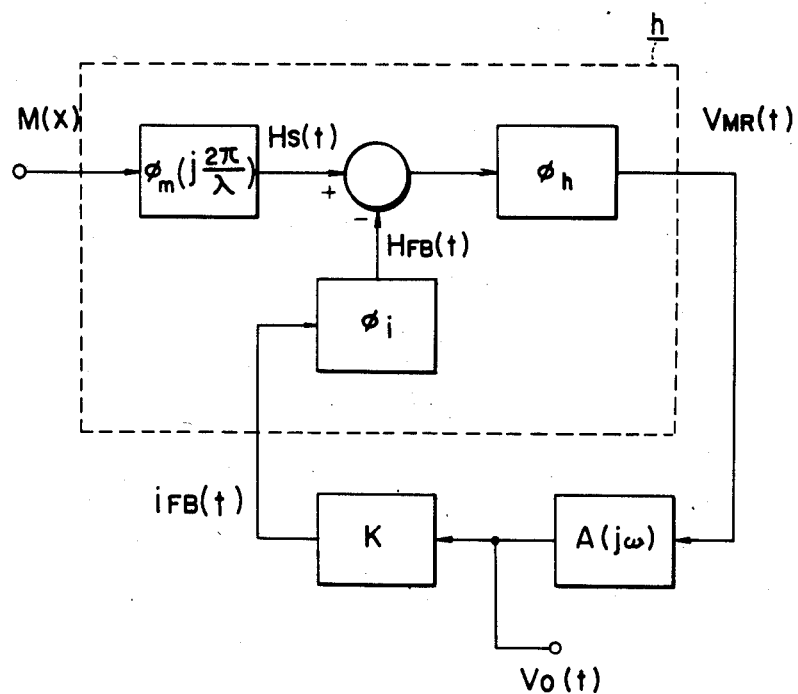
FIG. 14 is an equivalent circuit diagram of the apparatus in FIG. 13.

FIG. 14 shows an equivalent circuit of the magnetoresistance effect type magnetic head apparatus in FIG.

13. Based on the recording signal M(x) of a traveling magnetic tape, a signal magnetic field $H_S(t)$ $$H_S(t) = M(x) \cdot \phi_m (j2\pi/\lambda) \quad (16)$$

is generated, and also a feedback magnetic field $-H_{FB}(t)$ is generated. Thus, the output voltage V(t)

$$V(t) = \phi_h \cdot \{H_S(t) - H_{FB}(t)\} \quad (17)$$

is obtained from the MR sensing element 5.
Output signal Vo(t)

$$Vo(t) = A(j\omega) \cdot V(t) \quad (18)$$

is obtained from the signal taking-up means comprising circuits 16, 19, 22, 21. The feedback magnetic field $-H_{FB}(t)$ is represented as follows:

$$-H_{FB}(t) = K \cdot A(j\omega) \quad (19)$$

In addition, $\phi_m(j2\pi/\lambda)$ is a transfer function at the input side of the MR sensing element 5 ($\lambda$: wave length), $\phi_h$ is a transfer function at the output side of the MR sensing element 5, $A(j\omega)$ is a transfer function of the signal taking-out means, K is a transfer function of the buffer amplifier 28, and $\phi_i$ is a transfer function of the bias conductor 3.

FIG. 12A shows a resistance versus magnetic field characteristic curve of the MR sensing element 5. If superposition a magnetic field formed of a superimposition of the rectangular wave a.c. magnetic field $H_B(t)$ of a large level and the signal magnetic field $H_S(t)$ as shown in FIG. 12B is applied to the MR sensing element 5, the output voltage V(t) as shown in FIG. 12C is obtained from the MR sensing element 5. If the output voltage V(t) and rectangular wave a.c. signal as shown in FIG. 12D are multiplied in the multiplier 22, signal output Vo(t) corresponding to the signal magnetic field $H_S(t)$ in FIG. 12B is obtained at the output side of the low pass filter 21.

Figure 15:
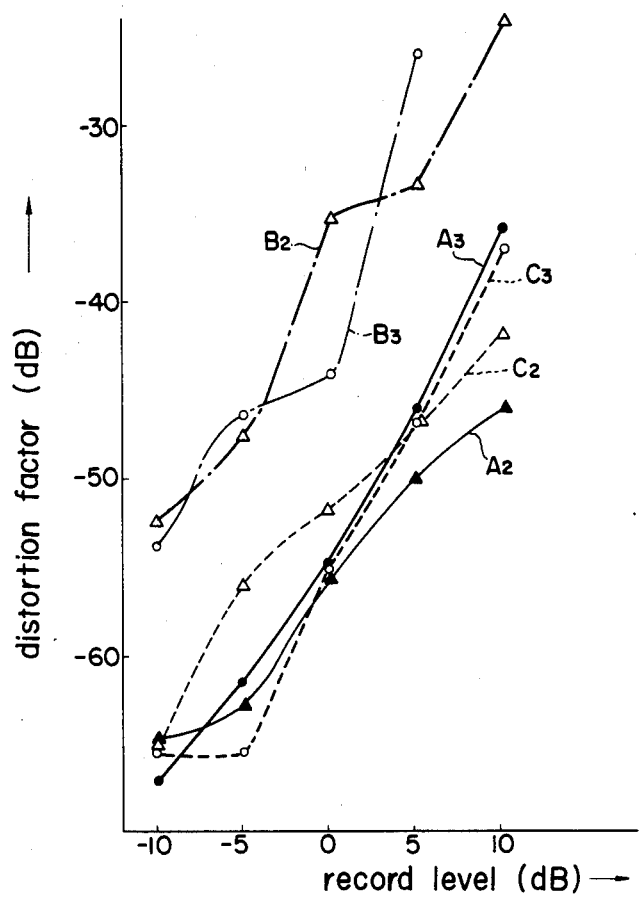
FIG. 15 is a diagram illustrating distortion factor characteristics.

FIG. 15 shows characteristics of second and third harmonic distortion of the signal output versus record level when a signal of single frequency 315 Hz is recorded on a magnetic tape and is reproduced by various magnetic head apparatuses. In this case, a metal tape was used as a magnetic tape. The tape speed, was 4.7 cm/sec. The recording magnetic head was the usual ring type magnetic head. In the case of the MR type magnetic head apparatus, the detecting current $i_{MR}$ flowing through the MR sensing element 5 was 5 mA, the rectangular wave a.c. current $i_A$ flowing through the bias conductor 3 was 5 mA, and the frequency was 250 kHz.

In FIG. 15, curves $B_2$, $B_3$ show characteristics of second and third harmonic distortion of the output signal by the magnetoresistance effect type magnetic head apparatus in FIG. 9. It is understood that distortion in the curves $B_2$, $B_3$ is considerably large in comparison to characteristics of the second and third harmonic distortion of the output signal by the usual ring-shaped magnetic head apparatus shown in curves $A_2$, $A_3$.

Figure 13:
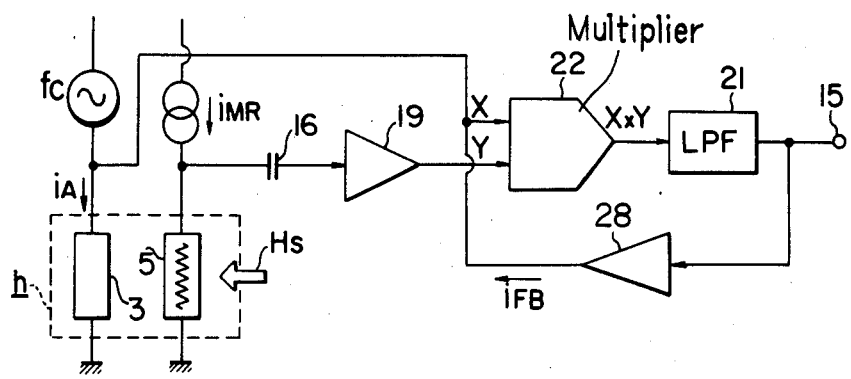
FIG. 13 is a diagram illustrating a construction of an MR magnetic head apparatus as another embodiment of the invention.

On the contrary, curves $C_2$, $C_3$ show characteristics of second and third harmonic distortion of the output signal by the magnetoresistance effect type magnetic head apparatus in FIG. 13. It is understood that distortion in the curves $C_2$, $C_3$ is as small as that of characteristics of second and third harmonic distortion of the output signal by the usual ring-shaped magnetic head apparatus shown in the curves $A_2$, $A_3$.

Figure 16:
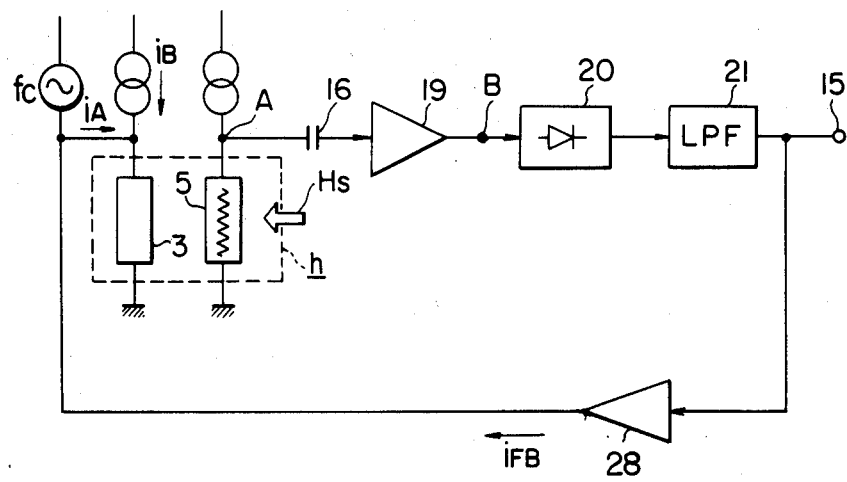
FIGS. 16, 17, 18 and 19 are diagrams illustrating construction of MR magnetic head apparatuses in other embodiments of the invention.

Next, another embodiment of the invention will be described referring to FIG. 16. The embodiment shows application of the magnetic feed back of FIG. 13 to the magnetoresistance effect type magnetic head apparatus in FIG. 6. Parts in FIG. 16 corresponding to FIG. 6 are designated by the same reference numerals and a repeat description shall be omitted. In the embodiment, a signal output from a low pass filter 21 is supplied to a buffer amplifier 28, and current $i_{FB}$ from the buffer amplifier 23 flows through a bias conductor 3. Negative feedback magnetic field $H_{FB}$ is generated from the bias conductor 3 (A separate bias conductor may be provided, and the current $i_{FB}$ may flow through the separate bias conductor), and is applied to an MR sensing element 5. A remaining description shall be omitted in view of the previous description of the embodiment in FIG. 13.

The magnetoresistance effect type magnetic head apparatus in the embodiment comprises the magnetoresistance effect sensing element to which the signal magnetic field is applied. A high frequency magnetic field generating means supplied the magnetoresistance effect sensing element with a high frequency bias magnetic field. The signal taking-out means devices a signal output corresponding to the signal magnetic field from the output of the magnetoresistance effect sensing element. A negative feedback magnetic field generating means applies the magnetoresistance effect sensing element with a negative feedback magnetic field corresponding to the signal output from the signal taking-out means.

According to such a construction, in the magnetoresistance effect type magnetic head apparatus wherein the magnetoresistance effect sensing element with a high frequency, bias magnetic field is applied, linearity is further improved and distortion is further reduced, generation of Barkhausen noise becomes small, dynamic range is further widened, and dispersion of the output becomes small.

EXAMPLE 5

Figure 17:
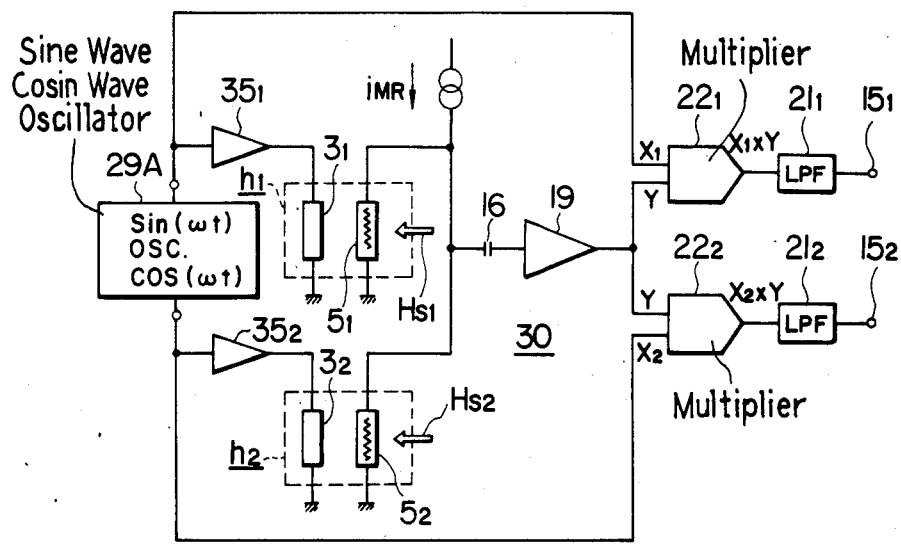

A fifth embodiment of the invention will now be described referring to FIG. 17. In the embodiment, the above-mentioned MR head is made a multi-channel structure and a part of the circuit is commonly used so as to simplify the construction. In FIG. 17, symbols $h_1$, $h_2$ designate first and second head elements respectively, which have first and second bias conductors $3_1$, $3_2$ and first and second MR sensing elements $5_1$, $5_2$ in structure similar to FIG. 1. Detecting d.c. current $i_{MR}$ flows in the first and second MR sensing elements $5_1$, $5_2$ which are connected in parallel (or in series) from the viewpoint of a d.c. connection. Sine wave and cosine wave signals of the same frequency $f_c$ are supplied from a sine wave/cosine wave oscillator 29A to buffer circuits $35_1$, $35_2$, and sine wave and cosine wave bias currents from the buffer circuits $25_1$, $25_2$ flow through the bias conductors $3_1$, $3_2$ respectively. First and second signal magnetic fields $H_{S1}$, $H_{S2}$ are applied to the first and second MR sensing elements $5_1$, $5_2$ respectively.

Numerals 16 and 19 designate a capacitor and an amplifier in a signal taking-out means 30. Composite outputs of the first and second MR sensing elements $5_1$, $5_2$ pass through the capacitor 16 in common fashion, and are supplied to the amplifier 19. Outputs Y of the amplifier 19 are supplied to first and second multipliers $22_1$, $22_2$ and are multiplied with the sine wave and cosine wave signals $X_1$, $X_2$ respectively. The multiplied outputs $X_1 \times Y$, $X_2 \times Y$ are supplied to first and second low pass filters $21_1$, $21_2$ respectively. Thus, first and second output terminals $15_1$, $15_2$ are supplied with first and second signal outputs corresponding to the first and second signal magnetic fields $H_{S1}$, $H_{S2}$ applied to the first and second MR sensing elements $5_1$, $5_2$.

Figure 4:
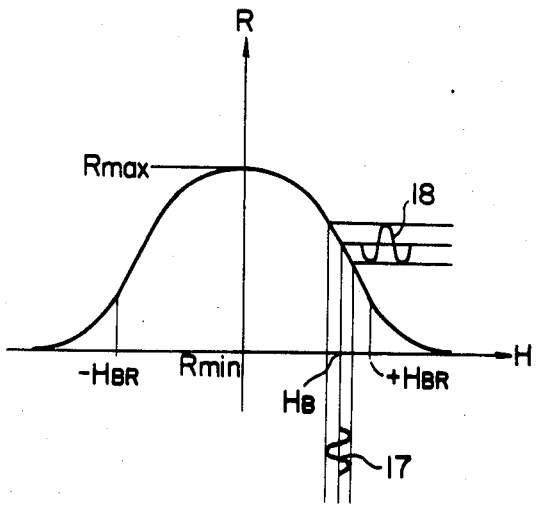
FIG. 4 is a diagram of an MR characteristic curve illustrating operation of an MR head apparatus in the prior art.
Figure 5:
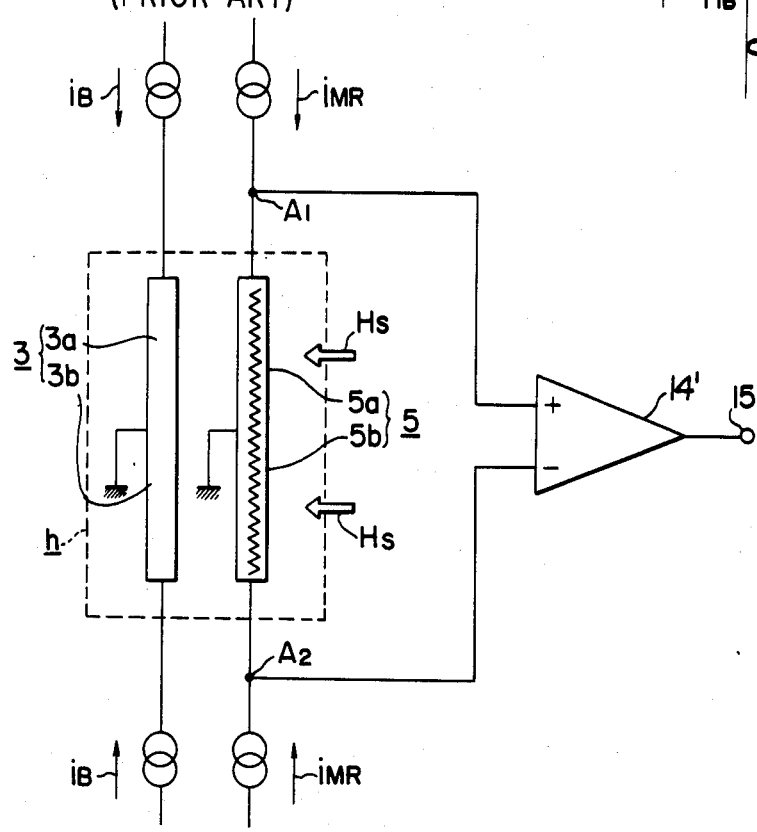
FIG. 5 is a diagram illustrating a construction of an MR head apparatus as another example in the prior art.

Next, operation of the embodiment in FIG. 17 will be analyzed using mathematical formulae. Assume that a maximum resistance of the MR sensing element is $R_n$, a maximum resistance varying rate is $a_n$, an anisotropic magnetic field is $H_{kn}$, an amplitude of bias magnetic field is $H_{Bon}$, a signal magnetic field is $H_{sn}(t)$, and that detecting currents flowing through the MR sensing elements $5_1$, $5_2$ are $i_1$, $i_2$ ($i_1 = i_2$). A relationship of the magnetic field H to the resistance $r_n$ for the characteristic curve in FIG. 4 is represented by following formula.

$$r_n = R_n \left\{ 1 - a_n \left( \frac{H}{H_{kn}} \right)^2 \right\} \tag{21}$$

The bias magnetic fields $H_{B1}$, $H_{B2}$ applied to the MR sensing elements $5_1$, $5_2$ are represented as follows:

$$H_{B1} = H_{B01} \sin(\omega t) \tag{22}$$

$$H_{B2} = H_{B02} \cos(\omega t) \tag{23}$$

A frequency spectrum of $H_{sn}(t)$ {$H_{S1}(t)$, $H_{S2}(t)$} applied to the MR sensing elements $5_1$, $5_2$ has the maximum signal frequency $f_s$ or less, and the bias frequency $f_c$ is selected so that $f_c > 3f_s$. Then output $V_{MRn}$ of the MR sensing element is represented as follows:

$$V_{MRn} = i_n \times r_n \tag{24}$$

$$= i_n \cdot R_n \left\{ 1 - a_n \left( \frac{H}{H_{kn}} \right)^2 \right\}$$

Calculating only a variable, component of the output of the MR sensing element, the following formula is obtained.

$$V_{MRn} = -i_n \cdot R_n \cdot a_n \left( \frac{H_n}{H_{kn}} \right)^2 \tag{25}$$

Substituting the formula (2) for Hn, the following formula is obtained.

$$V_{MRn} = -i_n \cdot R_n \cdot a_n \frac{(H_{Bn} + H_{sn}(t))^2}{H_{kn}^2} \tag{26}$$

When the MR sensing elements $5_1$, $5_2$ are connected in series, the variable component $V_A$ of the output is expressed as follows:

$$V_A = V_{MR1} + V_{MR2} \tag{27}$$

-continued $$= \frac{i_1 R_1 a_1}{H_{k1}^2} (H_{B1} + H_{S1}(t))^2 - \frac{i_2 R_2 a_2}{H_{k2}^2} (H_{B2} + H_{S1}(t))^2$$

Assuming that $$K_1 \equiv -\frac{i_1 R_1 a_1}{H_{k1}^2} \text{ and } K_2 \equiv \frac{i_2 R_2 a_2}{H_{k2}^2},$$

formula (27) is represented as follows:

$$V_A = K_1 (H_{B1} + H_{S1}(t))^2 + K_2 (H_{B2} + H_{S2}(t))^2 \tag{28}$$

Substituting formulae (22), (23) for formula (28), the formula (28) is expressed as follows:

$$\begin{aligned}V_A = & K_1 \{H_{B01} \sin(\omega t) + H_{S1}(t)\}^2 + K_2 \{H_{B02} \cos(\omega t) + H_{S2}(t)\}^2 \\ = & K_1 [H_{B01}^2 \sin^2(\omega t) + 2H_{B01} H_{S1}(t) \sin(\omega t) + \\ & \{H_{S1}(t)\}^2] + K_2 [H_{B02}^2 \cos^2(\omega t) + \\ & 2H_{B02} H_{S2}(t) \cos(\omega t) + \{H_{S2}(t)\}^2]\end{aligned} \tag{29}$$

The voltage $V_A$ is amplified by the amplifier (amplification factor: A). If the voltage $V_A$ is multiplied with $\sin(\omega t)$ by the multiplier $22_1$, the multiplying output $Z_1$ is expressed by following formula.

$$\begin{aligned}Z_1 = & A \cdot V_A \cdot \sin \omega t \\ = & AK_1[H_{B01}^2 \sin^3(\omega t) + 2H_{B01} H_{S1}(t) \sin^2(\omega t) + \\ & \{H_{S1}(t)\}^2 \sin(\omega t)] + AK_2[H_{B02}^2 \cos^2(\omega t) \sin(\omega t) + \\ & 2H_{B02} H_{S2}(t) \cos(\omega t) \sin(\omega t) + \{H_{S2}(t)\}^2 \sin(\omega t)]\end{aligned} \tag{30}$$

If the output $Z_1$ passes through the low pass filter $21_1$ and the $\omega$ component or more is cut off, it follows that
the term $\sin^3(\omega t) \to 0$
the term $\sin^2(\omega t) \to \frac{1}{2}$
the term $\sin \omega t \to 0$
the term $\cos^2(\omega t) \sin \omega t$ becomes $$(1 = \sin^2(\omega t)) \sin \omega t = \sin \omega t - \sin^3(\omega t) \to 0$$

$$2 \cos(\omega t) \sin(\omega t) = 2 \sin(2\omega t) \to 0$$

As a result, the output $V_1$ of the filter $21_1$ is represented by following formula.

$$V_1 = AK_1 \cdot H_{B01} \cdot H_{S1}(t) \tag{31}$$

Also the output $V_2$ of the filter $21_2$ is represented by following formula.

$$V_2 = AK_2 \cdot H_{B02} \cdot H_{S2}(t) \tag{32}$$

EXAMPLE 6

Figure 18:
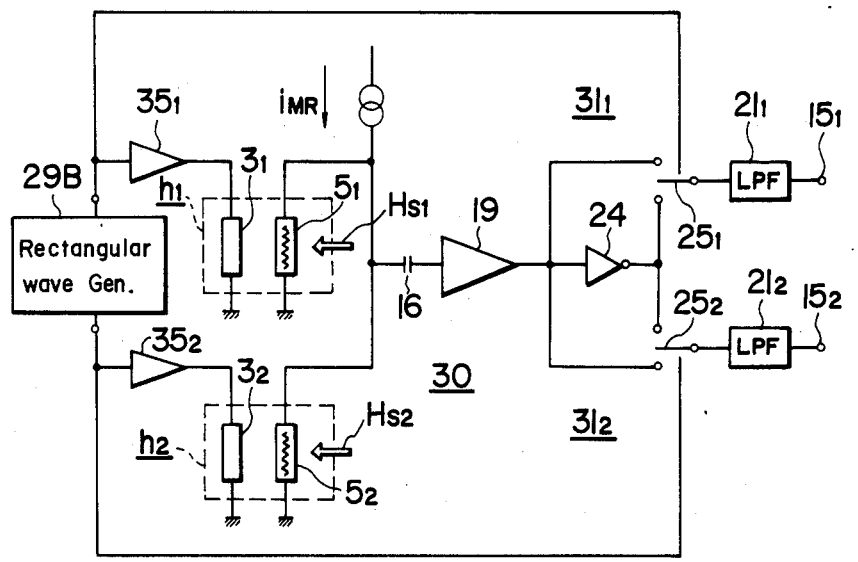

Another embodiment of the invention will now be described referring to FIG. 18. Parts in FIG. 18 corresponding to FIG. 17 are designated by the same reference numerals and the repeated description shall be omitted. In the embodiment, the sine wave/cosine wave oscillator 29A in FIG. 17 is replaced by a rectangular wave generator 29B which generates first and second rectangular wave signals having the same frequency and phase difference of 90° with each other. A signal taking-out means 30 is composed of a capacitor 16 and an amplifier 19. First and second multipliers $22_1$, $22_2$ are replaced with an inverter 24 and first and second switches $25_1$, $25_2$ where an inverted or non-inverted output of the amplifier 19 is alternately derived by controlling the switches by the first and second rectangular signals having a phase difference of 90° with each other. Outputs of the first and second change-over switches $25_1$, $25_2$ are supplied to first and second low pass filters $21_1$, $21_2$ respectively.

The MR type magnetic head apparatus in Examples 5, 6 comprises the following. First and second magneto-resistance effect sensing elements are provided (MR sensing elements) $5_1$, $5_2$ to which first and second signal magnetic fields $H_{S1}$, $H_{S2}$ are applied separately. First and second bias magnetic field generating means 29A (or 29B) are also provided connecting to bias conductors $3_1$, $3_2$ which apply the first and second MR sensing elements $5_1$, $5_2$ with first and second a.c. bias magnetic fields having the same frequency and phase difference of 90° with each other. A signal taking-out means 30 takes out a composite signal of signal outputs corresponding to the first and second signal magnetic fields $H_{S1}$, $H_{S2}$ from outputs of the first and second MR sensing elements $5_1$, $5_2$. First and second multiplying means $22_1$, $22_2$ multiply first and second a.c. signals in synchronization with the first and second a.c. bias magnetic fields of the composite signal. First and second low pass filters $21_1$, $21_2$ are connected to outputs of the first and second multiplying means $22_1$, $22_2$. First and second signal outputs corresponding to the first and second signal magnetic fields $H_{S1}$, $H_{S2}$ are obtained from the first and second low pass filters $21_1$, $21_2$.

According to such a construction, the composite signal of signal outputs corresponding to the first and second signal magnetic fields is taken out from outputs of the first and second MR sensing elements, $5_1$, $5_2$ by the common signal taking-out means 30. The composite signal is supplied to the first and second multiplying means $22_1$, $22_2$ and is multiplied by first and second a.c. signals in synchronization with the first and second a.c. bias magnetic field to be applied to the, first and second MR sensing elements $5_1$, $5_2$, and which have the same frequency and phase difference of 90° with each other. The multiplied outputs are supplied to the first and second low pass filters $21_1$, $21_2$. The first and second signal outputs corresponding to the first and second signal magnetic fields $H_{S1}$, $H_{S2}$ are applied to the first and second MR sensing elements $5_1$, $5_2$, and are obtained separately from the first and second low pass filters $21_1$, $21_2$.

EXAMPLE 7

A seventh embodiment of the invention will now be described in detail referring to FIG. 19. In the embodiment, construction of a head element h is similar to FIG. 1 and FIG. 3 as already described. Numeral 26 designates a rectangular wave generator (or sine wave generator) as an a.c. signal generator, and a rectangular wave signal with a frequency $f_c$ from the rectangular wave generator 26 is supplied to a current driver 27. Rectangular wave current from the current driver 27 flows through a bias conductor 3.

Figure 20:
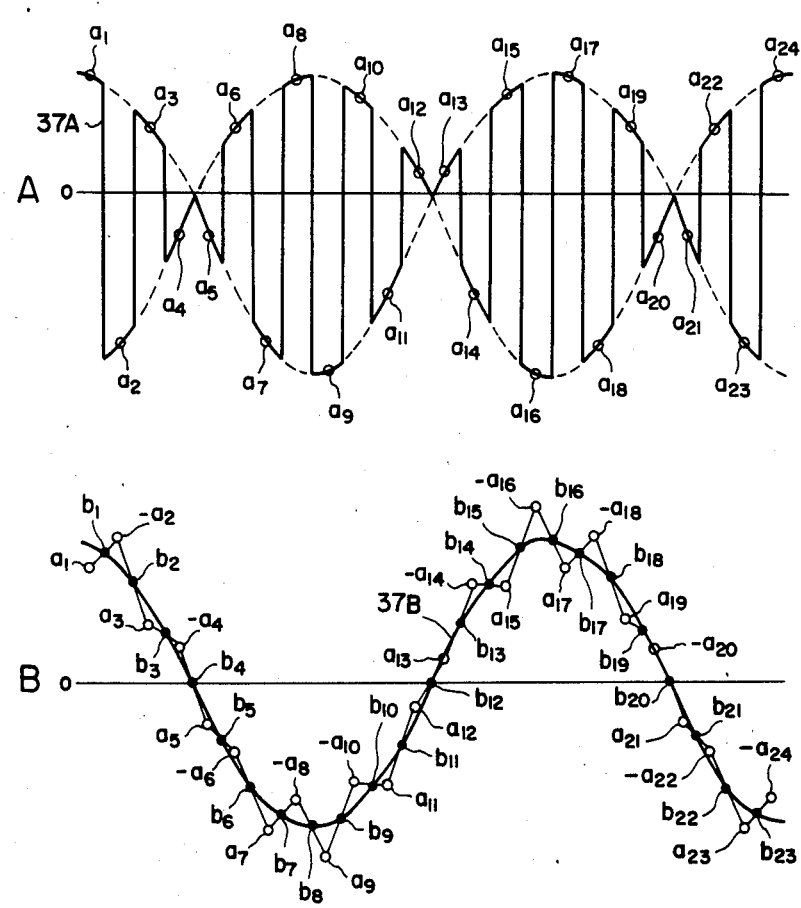
FIG. 20A, B is a waveform chart illustrating operation of the above apparatuses.

Output from an MR sensing element 5 passes through a capacitor 16 and an amplifier 19, and a rectangular wave signal 37A as shown in FIG. 20A is obtained at an output side of the amplifier 19.

The rectangular wave signal 37A is supplied to a sample hold circuit 32 for sample hold operation. A sample pulse signal is produced on the basis of a pulse signal from a pulse generator 36 and in synchronization therewith and has a prescribed phase and prescribed time width. The pulse generator 36 generates a pulse signal in synchronization with the rectangular wave signal from the rectangular wave generator 26 and has a double frequency $2 f_c$ in comparison to the rectangular wave signal. The pulse signal is supplied as a sample pulse to the sample hold circuit. In FIG. 20A, each of symbols $a_1, a_2, \ldots, a_{24}, \ldots$ shows a sampling point and value at that point.

An output of the sample hold circuit 32 is supplied to an A/D converter 33 and is converted into a digital signal. The output of the A/D converter is supplied to a digital filter 34. A pulse signal from the pulse generator 36 is supplied to the A/D converter 33 and the digital filter 34.

Next, the function of the digital filter 34 will be described. In the digital filter 34 as shown in FIG. 20A, B, a sign of every alternate digital value among the digital value from the A/D converter 33 corresponding to the sample values $a_1$–$a_{24}$ in the sample hold circuit 32 (for example, the digital values corresponding to the sample values $a_2, a_4, a_6, \ldots a_{22}, a_{24}, \ldots,$) is inverted into the digital values corresponding to the sample values $a_1, -a_2, a_3, -a_4, a_5, -a_6, \ldots, a_{21}, -a_{22}, \ldots$ Arithmetic mean values of neighboring digital values corresponding to the inversion are taken and smoothed. Thus an output of the digital filter 34 becomes the digital values corresponding to the arithmetic mean values $b_1 = (a_1 - a_2)/2$, $b_2 = (-a_2 + a_3)/2$, $b_3 = (a_3 - a_4)/2, \ldots,$ $b_{22} = (-a_{22} + a_{23})/2$, $b_{23} = (a_{23} - a_{24})/2, \ldots,$ as shown in FIG. 20B. Consequently, if the output of the digital filter 34 is converted in a D/A conversion, an analog signal corresponding to the signal magnetic field $H_S$ is obtained as shown in curve 37B of FIG. 20B.

Figure 19:
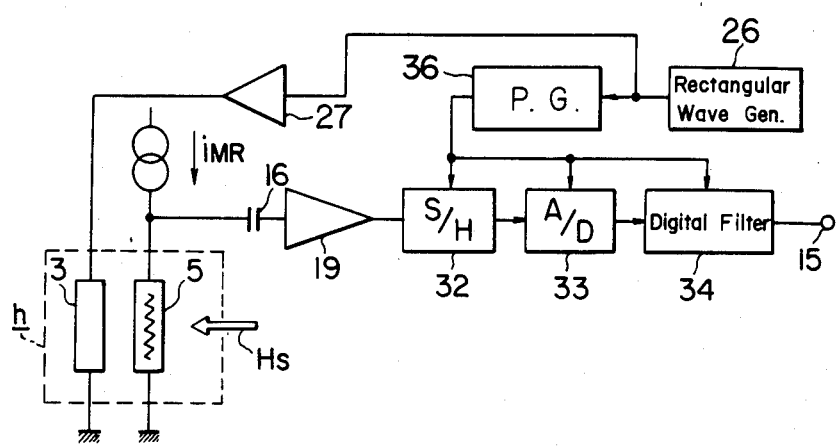

In FIG. 19, another construction may be provided wherein an inverter to invert an output of the amplifier, a sample hold circuit to execute a sample hold operation of an output of the inverter, and an A/D converter to convert an output of the sample hold circuit in an A/D conversion are added. A rectangular wave signal from the rectangular wave generator 26 is supplied to the sample hold circuit 32 and the A/D converter 33. The rectangular wave signal from the rectangular wave generator 26 is phase-shifted by 180° and is supplied to the sample hold circuit and the A/D converter both newly added. The rectangular wave signal from the rectangular wave generator 26 and the signal phase-shifted by 180° are supplied to the digital filter 34 to which outputs A/D converter 33 and the newly added A/D converter are to be supplied. The arithmetic mean values of the digital values from the A/D converter 33 and the newly added A/D converter are taken in sequence in the digital filter 34 with respect to neighoring values on the time axis.

EXAMPLE 8

Another embodiment of the invention will now be described referring to FIG. 21. The embodiment relates to a modification of the embodiment of FIG. 19 into a multi-channel structure, and parts in FIG. 21 corresponding to FIG. 19 are designated by the same reference numerals or with a subscript with respect to each channel, and the repeated description shall be partially omitted.

Figure 21:
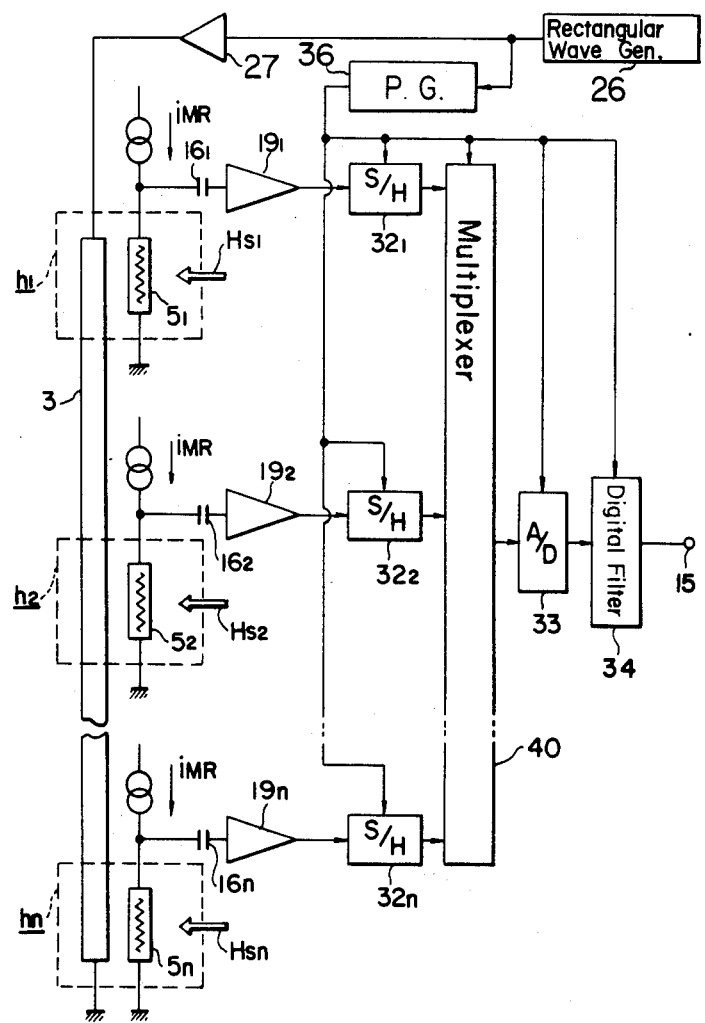
FIG. 21 and FIG. 23 are diagrams illustrating construction of MR magnetic head apparatuses as further embodiments of the invention.

In FIG. 21, symbols $h_1, h_2, \ldots, h_n$ designate head elements of first, second, ..., and n-th channels respectively, and a bias conductor 3 is commonly used. In sample hold circuits $32_1, 32_2, \ldots, 32_n$, each output 37A (refer to FIG. 22A) of amplifiers $19_1, 19_2, \ldots, 19_n$ of respective channels which is supplied to the sample hold circuits $32_1, 32_2, \ldots, 32_n$ is sampled and held by sampling pulse signal 42 (refer to FIG. 22B) produced on the basis of a pulse signal from a pulse generator 36 with frequency $2 f_c$, and each hold output is supplied to a multiplexer 40.

Figure 22:
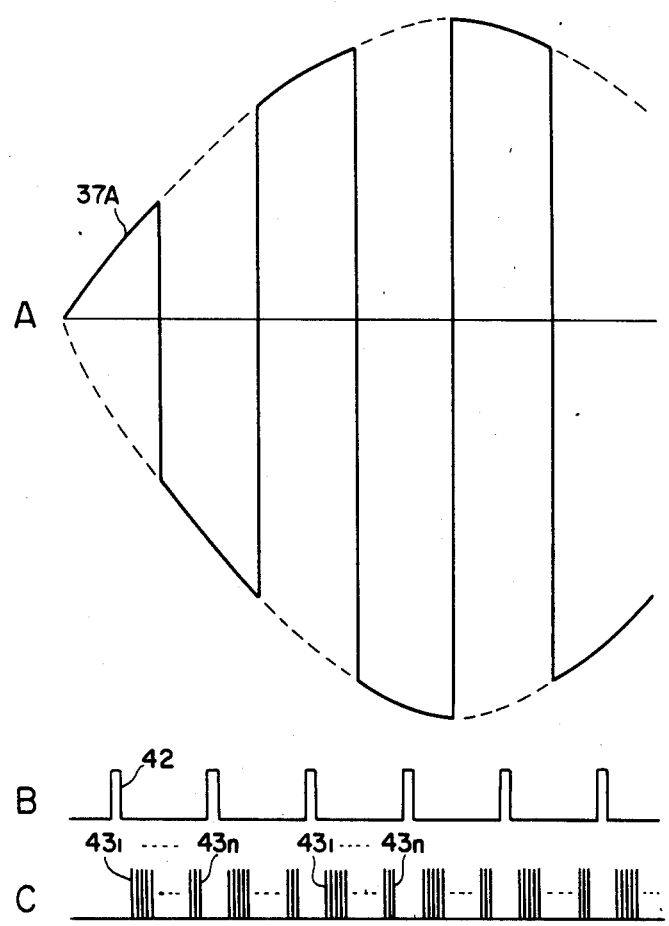
FIG. 22A-C and FIG. 24A-F are waveform charts illustrating operation of the MR magnetic head apparatus in FIG. 21 and FIG. 23 respectively.

In the multiplexer 40, analog outputs $43_1, 43_2, \ldots, 43_n$ (difference of level neglected) in every sampling of the sample-and-hold circuits $32_1, 32_2, \ldots, 32_n$ are converted into serial signals located at intermediate positions between sampling pulses as shown in FIG. 22C, and then the serial signals are supplied to an A/D converter 33 and the obtained digital signals are supplied to a digital filter 34. Thus, serial signals of digital arithmetic mean signals of various channels are obtained at an output terminal 15. If an output from the output terminal 15 is supplied to a demultiplexer, digital arithmetic mean signals for each channel, i.e. digital signals corresponding to the signal magnetic fields of the MR sensing elements $5_1, 5_2, \ldots, 5_n$ of each channel, are obtained.

In FIG. 21, sample pulses to be supplied to the sample-and-hold circuits $32_1, 32_2, \ldots, 32_n$ of respective channels may have a different phase by a prescribed amount in sequence, and outputs of the sample-and-hold circuits $32_1, 32_2, \ldots, 32_n$ of respective channels are supplied to the multiplexer 40 and added thereto so as to obtain the serial signal (refer to FIG. 22C).

EXAMPLE 9

Figure 23:
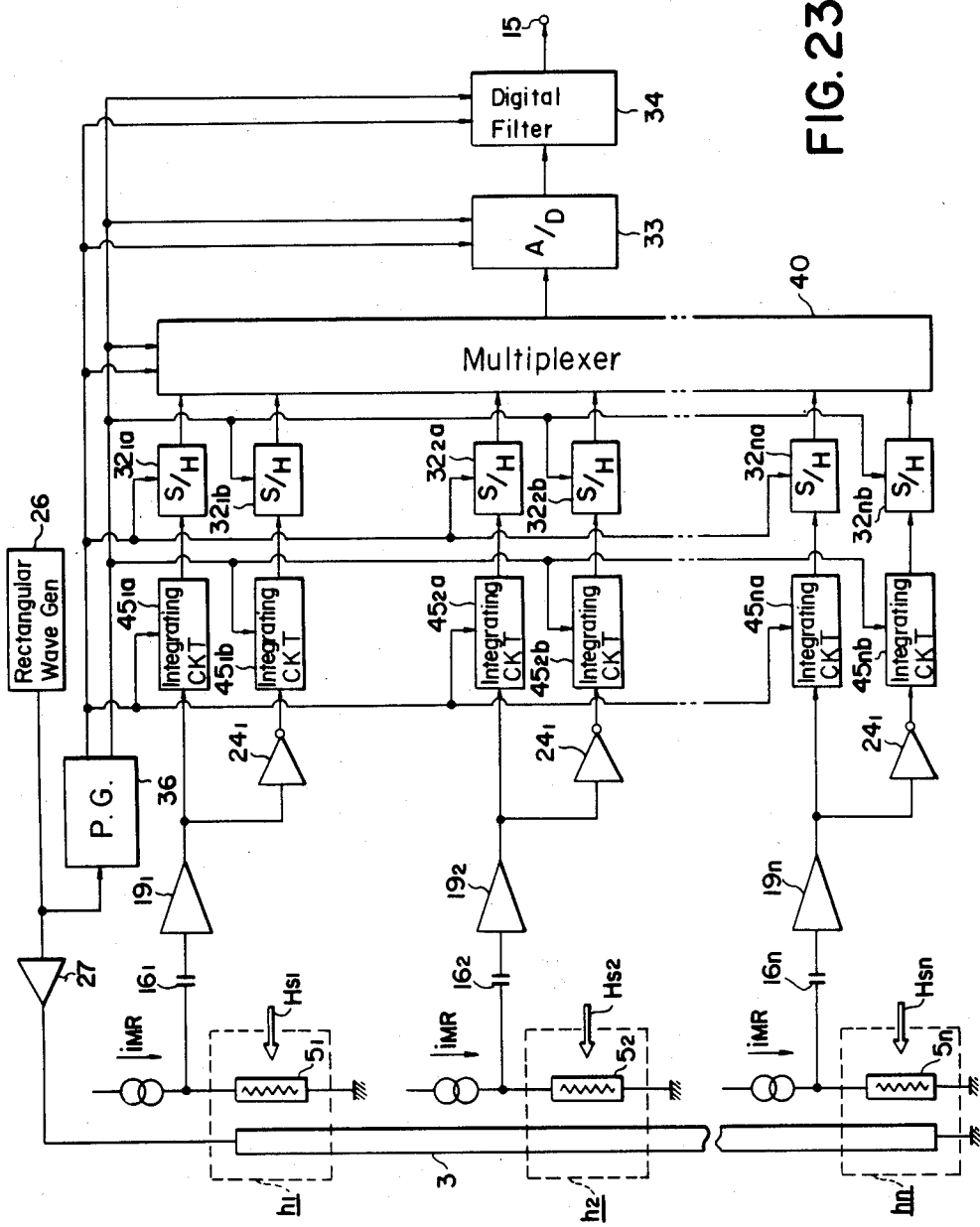

Still another embodiment of the invention will now be described referring to FIG. 23. Parts in FIG. 23 corresponding to FIG. 19 and FIG. 21 are designated by the same reference numerals, and the repeated description shall be omitted. Outputs of amplifiers $19_1, 19_2, \ldots, 19_n$ of respective channels are supplied directly to integrating circuits $45_{1a}, 45_{2a}, \ldots, 45_{na}$ and also through inverters $24_1, 24_2, \ldots, 24_n$ to integrating circuits $45_{1b}, 45_{2b}, \ldots, 45_{nb}$. Outputs of the integrating circuits $45_{1a}, 45_{2a}, \ldots, 45_{na}$ and $45_{1b}, 45_{2b}, \ldots, 45_{nb}$ of the channels are supplied to sample-and-hold circuits $32_{1a}, 32_{2a}, \ldots, 32_{na}$ and $32_{1b}, 32_{2b}, 32_{nb}$ respectively. An output of the sample-and-hold circuits $32_{1a}, 32_{2a}, \ldots, 32_{na}$ and $32_{1b}, 32_{2b}, \ldots, 32_{nb}$ are supplied to a multiplexer 40. Output of the multiplexer 40 is connected to a cascade circuit of an A/D converter 33 and a digital filter 34.

A rectangular wave signal from a rectangular wave generator 26 is supplied to a pulse generator 36 which produces two-phase rectangular wave signals in synchronization with the rectangular wave signal from the rectangular wave generator 36 and having the same frequency and phase difference of 180° with each other. For example, a rectangular wave signal with a non-inverted phase from the pulse generator 36 is supplied to the integrating circuits $45_{1a}, 45_{2a}, \ldots, 45_{na}$, the sample-and-hold circuits $32_{1a}, 32_{2a}, \ldots, 32_{na}$, the multiplexer 40, the A/D converter 33 and the digital filter 34. Also, a rectangular wave signal of inverted phase from the pulse generator 36 is supplied to the integrating circuits $45_{1b}, 45_{2b}, \ldots, 45_{nb}$, the sample-and-hold circuits $32_{1b}, 32_{2b}, \ldots, 32_{nb}$, the multiplexer 40, the A/D converter 33 and the digital filter 34.

In each output 37A (refer to FIG. 20A) of the amplifiers $19_1, 19_2, \ldots, 19_n$, portions corresponding to sample points $a_1, a_3, \ldots, a_{23}, \ldots$ are integrated by the integrating circuits $45_{1a}, 45_{2a}, \ldots, 45_{na}$, and portions corresponding to sample points $a_2, a_4, \ldots, a_{24}, \ldots$ are integrated by the integrating circuits $45_{1b}, 45_{2b}, \ldots, 45_{nb}$.

Figure 24:
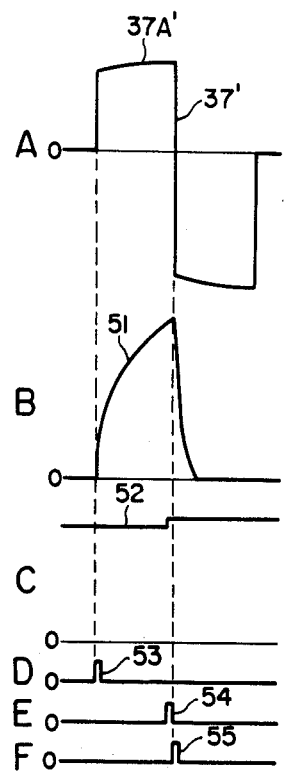

Next, operation of the integrating circuits and the sample-and-hold circuits in FIG. 23 will be described referring to FIG. 24. FIG. 24A shows output 37A of the amplifier, and rectangular wave signal 37A', as a part of the output 37A is formed so that integration is started by integration set pulse 53 (refer to FIG. 24D) generated at the front edge, the integration output is sampled by sample pulse 54 (refer to FIG. 24E) generated immediately before the rear edge, and the integration is reset by an integration reset pulse 55 (refer to FIG. 24F) generated at the rear edge.

Outputs of the sample-and-hold circuits $32_{1a}, 32_{2a}, \ldots, 32_{na}; 32_{1b}, 32_{2b}, \ldots, 32_{nb}$ of respective channels are converted into serial signals by the multiplexer 40, and are then supplied to the A/D converter 33, are converted into digital signals, and are further supplied to the digital filter 34. In the digital filter 34, an arithmetic mean value of neighboring data on the time axis is estimated with respect to the signal of each channel. A serial signal of digital arithmetic mean data is thus obtained at an output terminal 15. The serial signal from the output terminal 15 is supplied to a demultiplexer (not shown) and is separated into data of individual channels, thereby digital signals of respective channels corresponding to the signal magnetic fields $H_{S1}, H_{S2}, \ldots, H_{Sn}$ of the channels are obtained.

In addition, each channel may be provided with one integrating circuit and one sample-and-hold circuit and a sign inversion of every alternate sample in the sample data may be effected by the multiplexer 40 or the digital filter 34.

According to the invention as above described, a magnetoresistance effect type magnetic head apparatus of an a.c. bias system using a multiplier and a low pass filter is obtained so that the circuit is formed as a digital circuit and the multi-channel circuit is easily implemented.

Particularly, an output of the MR sensing element is integrated and then sampled and held, thus the S/N ratio of the reproduction signal can be increased.

A magnetoresistance effect type magnetic head apparatus in Examples 7 and 8 comprises a magnetoresistance effect sensing element (MR sensing element) 5 to which the magnetic field is applied. An magnetic field generating means 3, 26 applies the MR sensing element 5 with an a.c. bias magnet field. A sample-and-hold circuit 32 samples and holds the output of the MR sensing element 5 in synchronization with the a.c. bias magnetic field. An A/D converter 33 effects an A/D conversion of the output of the sample-and-hold circuit 32. A digital filter 34 receives the digital signals from the A/D converter 33. The digital filterr 34 produces a smoothed output of digital signals with a sign inversion at every alternate signal in response to the signal magnetic field.

A magnetoresistance effect type magnetic head apparatus in Example 9 is formed so that outputs of MR sensing elements $5_1, 5_2, \ldots, 5_n$ in the magnetoresistance effect type magnetic head apparatus of Examples 7 and 8 are supplied to integrating circuits $45_{1a}, 45_{2a}, \ldots, 45_{na}$ and $45_{1b}, 45_{2b}, \ldots, 45_{nb}$, and outputs of the integrating circuits are supplied to sample-and-hold circuits $32_{1a}, 32_{2a}, \ldots, 32_{na}, 32_{1b}, 32_{2b}, \ldots, 32_{nb}$.

Consequently, in Example 7, an output from the MR sensing element 5 is sampled and held in synchronization with the a.c. bias magnetic field and a multiplication is thus effected. The sample hold ouput is supplied to the digital filter 34 and is smoothed. The digital filter 34 provides the smoothed output as a digital output with a sign inversion at every alternate sample in response to the signal magnetic field applied to the MR sensing element 5. Thus, since the circuit is a digital circuit, the circuit scale is not apt to become large in spite of an increase of the number of channels.

In Example 8, outputs of the MR sensing elements $5_1, 5_2, \ldots, 5_n$ are integrated and then sampled and held, thus a S/N ratio of the reproduction signal is increased.

Although various minor changes and modifications might be proposed by those skilled in the art, it will be understood that we wish to include within the claims of the patent warranted hereon all such changes and modifications as reasonably come within our contribution to the art.

What is claimed is:

1. A magnetic transducer head utilizing magnetoresistance effect, comprising:
    a magnetoresistance effect sensing element means for sensing a signal magnetic field on a travelling magnetic recording medium;
    means for applying a high frequency magnetic field to said sensing element means;
    means for obtaining an output from said sensing element means;
    means for rectifying said output to form a rectified signal; and
    low pass filter means supplied with said rectified signal for deriving an output corresponding to said signal magnetic field.

2. A magnetic transducer head according to claim 1 wherein said means for applying a high frequency magnetic field comprises a bias conductor having an ac bias current applied thereto.

3. A magnetic transducer head according to claim 2 wherein a dc bias current is combined with the ac bias current through the bias conductor.

4. A magnetic transducer head according to claim 1 wherein a magnetoresistance effect strip-shaped sensing element is positioned adjacent a strip-shaped bias conductor to which a high frequency ac bias current is applied.

5. A magnetic transducer head utilizing magnetoresistance effect, comprising:
    a magnetoresistance effect sensing element means for sensing a signal magnetic field on a travelling magnetic recording medium;
    means for deriving a high frequency signal;
    means for applying a high frequency magnetic field synchronized with said high frequency signal to said sensing element means;
    means for obtaining an output from said sensing element means;
    means for multiplying said output with said high frequency signal to derive a multiplied signal; and
    low pass filter means supplied with said multiplied signal for deriving at an output thereof an output signal corresponding to said signal magnetic field.

6. A magnetic transducer head according to claim 5 wherein a magnetoresistance effect sensing element is positioned adjacent a bias conductor and an ac bias current generator is connected to the bias conductor and also to a first input of a multiplier, the other input of the multiplier connecting to an output of the magnetoresistance effect transducer element, and wherein an output of the multiplier connects to said low pass filter means.

7. A magnetic transducer head according to claim 5 further comprising feed back means connected between said low pass filter means output and said means for applying the high frequency magnetic field to said sensing element.

8. A magnetic transducer head according to claim 5 wherein said means for deriving a high frequency signal comprises a high frequency rectangular wave generator.

9. A magnetic transducer head utilizing magnetoresistance effect, comprising:
    first and second magnetoresistance effect sensing element means each for respectively sensing a first and second signal magnetic field;
    first means for deriving a first high frequency signal;
    second means for deriving a second high frequency signal having a phase difference of $\pi/4$ relative to said first high frequency signal;
    means for applying a high frequency magnetic field synchronized with said first and said second high frequency signals to said first and said second sensing element means respectively;
    means for obtaining a composite output from said first and said second sensing element means;
    first means for multiplying said composite output with said first high frequency signal to derive a first multiplied signal;
    first low pass filter means supplied with said first multiplied signal for deriving an output corresponding to said first signal magnetic field;
    second means for multiplying said composite output with said second high frequency signal to derive a second multiplied signal; and
    second low pass filter means supplied with said second multiplied signal for deriving an output corresponding to said second signal magnetic field.

10. A magnetic transducer head according to claim 9 wherein the first magnetoresistance effect sensing element means is positioned adjacent a first bias conductor to which said first high frequency signal is connected and wherein said second magnetoresistance effect sensing element means is positioned adjacent a second bias conductor to which said second high frequency signal is connected, and wherein outputs of said first and second magnetoresistance effect sensing element means are connected through a common amplifier to said first and second means for multiplying.

11. A magnetic transducer head utilizing magnetoresistance effect, comprising:
    a magnetoresistance effect sensing element means for sensing a signal magnetic field on a travelling magnetic recording medium;
    means for deriving a high frequency signal;
    means for applying a high frequency magnetic field synchronized with said high frequency signal to said sensing element means;
    means for deriving an output from said sensing element means;
    sample-hold means for sampling and holding said output in synchronization with a sampling pulse having a frequency which is twice a frequency of said high frequency signal and for deriving a series of sampling outputs;

A/D converter means for converting said sampling outputs of said sample-hold means in synchronization with said sampling pulse; and digital filter means supplied with an output of said A/D converter means for deriving an output signal comprising a series of mean values formed from digitalized sampling outputs.

12. A magnetic transducer head according to claim 11 wherein said means for deriving a high frequency signal is a high frequency rectangular wave generator.

13. A magnetic transducer head according to claim 11 wherein said magnetoresistance effect sensing element means comprises a magnetoresistance sensing element positioned adjacent a bias conductor.

14. A magnetic transducer head according to claim 11 wherein said high frequency magnetic field is generated by a high frequency current flow synchronized with said high frequency signal through a conductor provided adjacent to said sensing means.

15. A magnetic transducer head utilizing magnetoresistance effect, comprising:

a magnetoresistance effect sensing element means for sensing a signal magnetic field on a travelling magnetic recording medium;

means positioned adjacent said sensing element means for applying a high frequency magnetic field to said sensing means, said means connecting to a high frequency signal source;

said magnetoresistance effect sensing element means connecting to a current source and also to a switch means and to an inverter, said switch means being controlled by said high frequency wave generator source so as to selectively switch through the output from the magnetoresistance effect sensing element means in either inverted or non-inverted fashion; and a low pass filter means connecting to an output of said switch means.

* * * * *